United States Patent [19]

Becker et al.

[11] 4,240,643
[45] Dec. 23, 1980

[54] ANNULAR SEAL

[75] Inventors: Bernd Becker, Leimen; Hans Forch, Birkenau; Adam Helfrich, Waldmichelbach; Gottfried Jung, Fürth, all of Fed. Rep. of Germany

[73] Assignee: Carl Freudenberg, Weinheim, Fed. Rep. of Germany

[21] Appl. No.: 938,726

[22] Filed: Aug. 31, 1978

[30] Foreign Application Priority Data

Sep. 28, 1977 [DE] Fed. Rep. of Germany ....... 2743501

[51] Int. Cl.³ .............................................. F16J 15/32
[52] U.S. Cl. .................................... 277/164; 277/186
[58] Field of Search ............... 277/153, 152, 123, 168, 277/186, 37, 50, 164, 165

[56] References Cited

U.S. PATENT DOCUMENTS

| 2,307,874 | 1/1943 | Bilde | 277/165 |
| 3,095,619 | 7/1963 | Peterson | 277/165 |
| 3,326,562 | 6/1967 | Deuring | 277/164 |

FOREIGN PATENT DOCUMENTS 2312548  9/1974  Fed. Rep. of Germany ............. 15/32

Primary Examiner—Robert I. Smith
Attorney, Agent, or Firm—Sprung, Felfe, Horn, Lynch & Kramer

[57] ABSTRACT

An annular seal for a shaft comprising an annular elastomeric lip 2 having an annular rim 2.1, and an annular reinforcing member 1 provided with a groove into which rim 2.1 fits. The portion of the member 1 spaced from the groove is compressible and in unassembled state is larger than in assembled state, the compression serving to lock the seal together. Multiple lips and/or grooves may be provided.

6 Claims, 3 Drawing Figures

ANNULAR SEAL

BACKGROUND

The invention relates to an annular seal consisting of a reinforcing member and an annularly constructed lip member made of an elastomeric material fastened thereto.

Seals of this kind are used, for example, in the sealing of the passage of shafts through housing walls. They consist usually of a reinforcing member of metal having an angular profile, a lip of an elastomeric substance being vulcanized onto the inwardly extending leg of the profile. The manufacture of such seals consequently requires special production equipment and involves high initial investments.

The fact that the reinforcement is made of metal is not coincidental, but results instead from the need to use a material whose surface will enter into a firm bond with the lip in the vulcanization process. Hitherto, satisfactory results have not been achieved in the use of thermoplastics for the construction of the reinforcement unless adhesives are used.

German Auslegeschrift No. 2,312,548 discloses a radial shaft sealing ring in which the lip, made of an elastomer, is gripped between the two axially associated halves of the reinforcing ring. To achieve a fluid-tight joint between the two parts, the position of installation must be such that an axial compression constantly takes place. Another disadvantage of this radial shaft sealing ring is that it consists of three individual parts which must be manufactured independently of one another. This necessarily involves relatively high production costs.

THE INVENTION

The invention is addressed to the problem of developing a bipartite annular seal which can be made in an especially economical manner, and which will provide excellent reliability of operation while allowing a wide range of materials to be used in the reinforcing ring.

This object is achieved in accordance with the invention in an annular seal of the kind mentioned hereinabove which is characterized by the fact that the lip has at least one annular rim projecting in the axial direction, by which it is held in a groove in a face of the reinforcing ring, at least the portion of the reinforcing member that lies outside of the groove being of flexible construction and being enlarged adjacent the groove to a diameter that is larger than the installed diameter.

In an especially advantageous embodiment, provision is made for the lip member to be joined to the reinforcing member by two or more rims confronting one another in a pincerlike manner. In such an embodiment, it is advantageous if is advantageous if the lip member is joined to the reinforcing member by two or more rims disposed radially one over the other.

With regard to the special configuration of the profile in the design of the rims, it has proven advantageous for the projecting portion to have a bulbous profile.

The reinforcing member consists advantageously of a thermoplastic, thermosetting plastic or elastomeric material. Depending on the material used, it may be desirable for the portion of the reinforcing member that is outside of the groove to be divided into a plurality of segments uniformly distributed about the circumference.

In regard to the profile of the reinforcing member, it has also proven desirable for the enlarged portion of the outside diameter to be beveled axially on both sides at a low angle.

The appended drawing refers to a number of embodiments of the annular seal of the invention:

Figure 1:
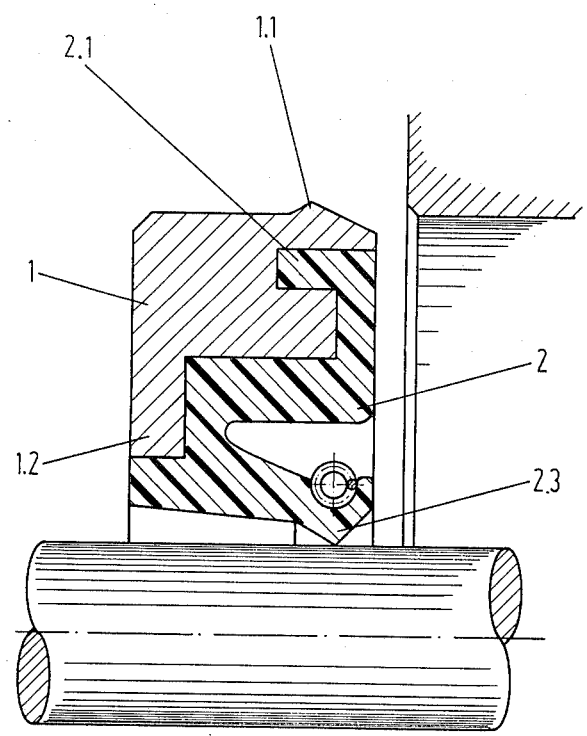
FIG. 1 shows an annular shaft seal in which the lip member is joined to the reinforcing member by only one annular rim projecting in the axial direction.
Figure 3:
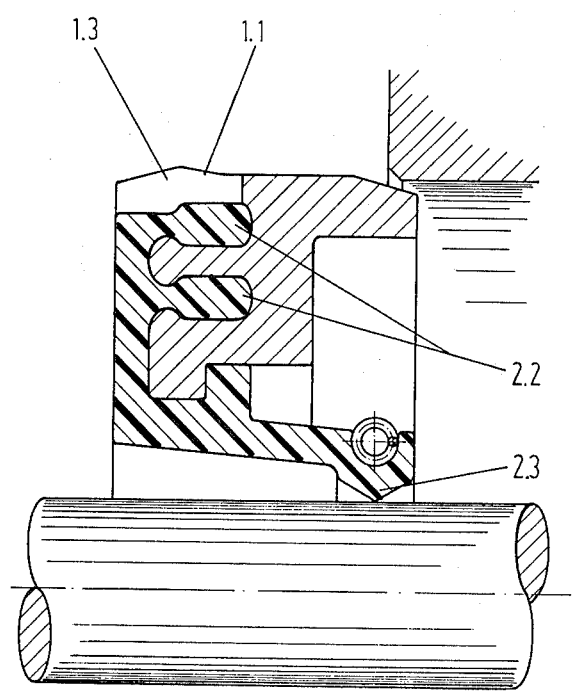
FIG. 3 shows an annular shaft seal in which the lip member is anchored in the reinforcing member by two rims disposed radially one over the other.
Figure 2:
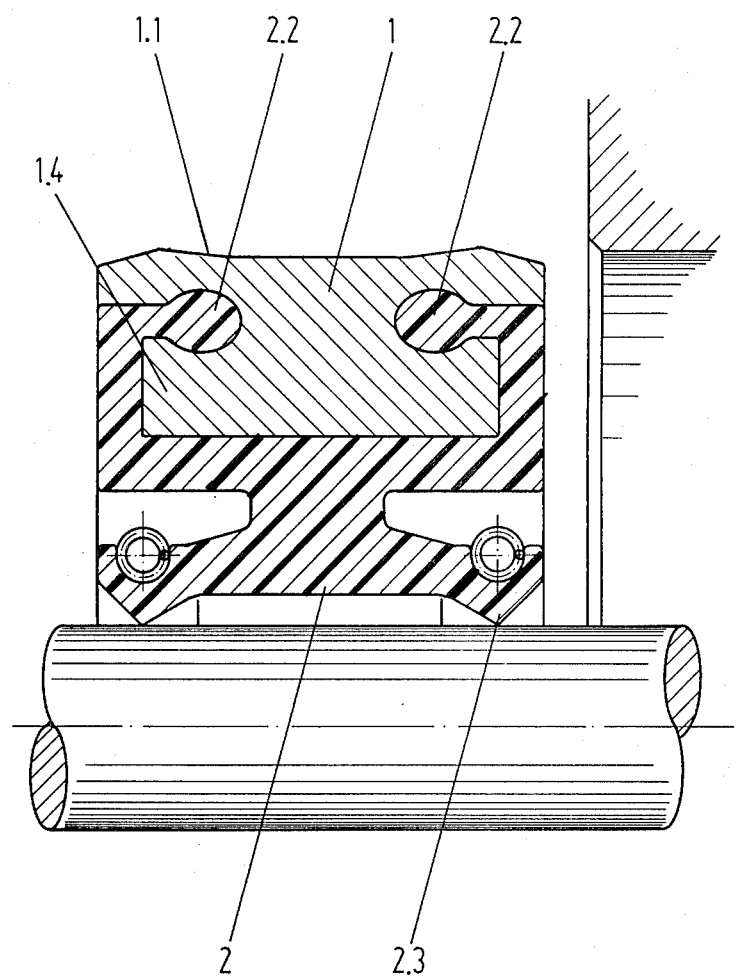
FIG. 2 shows a plunger seal in which the lip member is joined to the reinforcing member by two rims confronting one another in a pincer-like manner.

The annular seal of the invention consists of two independently manufactured components, namely the reinforcing member 1 and the lip member 2. The two parts are joined together by simple interengagement, it being especially important in accordance with the present invention that the reinforcing member is enlarged adjacent the groove to a diameter which is greater than the installed diameter. The reinforcing member is made flexible in this area, and consequently it is capable of adapting itself upon installation to the nominal diameter of the bore that receives it. By this deformation considerable radial forces are exerted on the rim of the lip member, which is constrictively gripped in the groove in the face of the reinforcing member, and the result is an absolutely reliable, fluid-tight anchoring together of the two members.

The materials that are the most suitable for the particular application can be selected for the production of either part. Thus, it is generally desirable to make the lip member 2 out of the known elastomeric materials. With regard to the construction of the reinforcing member, a wide variety of materials are available. The reinforcing member can be made of metal. On the other hand, especially in the case of the more complex cross-sectional configurations, it has proven to be more desirable to make it of a thermoplastic material, a thermosetting material, or an elastomer, it being important with regard to the configuration of the profile that the portion of the reinforcing member situated radially inside of the groove perform in the most rigid manner possible, while the portion that is outside of the groove is to be made as resiliently yielding as possible. Depending on the material used, it may therefore be desirable to divide this latter portion by slots 1.3 into segments uniformly distributed over the circumference.

For the better support of the sealing lip 2.3, it may be desirable to provide the reinforcing member with a web 1.2 projecting radially inwardly.

If the lip member is joined to the reinforcing member on the low-pressure side of the annular seal, it has been found expedient to shape the annularly projecting rims 2.2 of the lip member 2 such that they have a bulbous profile in the projecting portion. By such a construction, an interlocking anchorage is achieved in the installed state in addition to the frictional anchorage. If a plurality of such rims 2.2 are disposed one above the other concentrically, this will result in an additional sealing effect. In the case of large shaft diameters, another advantage can be realized in that it is possible to replace the lip member when it is worn, without replacing the reinforcing member. For this purpose it is necessary only to draw the reinforcing member so far out of the bore that contains it that its enlarged portion 1.1 can expand resiliently. The reinforcing member will then remain in this position, and the lip member, which may be divided, if desired, is replaced by simply snapping a new one in place. Then, by returning the reinforcing member to its original position, the constricting force is again applied to the annular bead 2.1, and thus an absolutely sealing, interlocking as well as frictional anchoring together of the two parts of the annular seal is brought about.

The oversize of the outside diameter of the reinforcing member adjacent the axially disposed groove in the end face is to be in accordance with the desired constricting action. An oversize of 0.5 to 1 mm beyond the otherwise cylindrically shaped reinforcing member has proven generally satisfactory for all sizes under 100 mm.

Especially when the reinforcing member is made of a plastic it has proven desirable for the oversized portion of the outside diameter to be beveled on both sides at a shallow angle in both axial directions. The object of this is especially to achieve a purely resilient constriction of the outside diameter to the nominal size while largely avoiding any permanent deformation. The bevel angles that have proven to be particularly suitable are of the order of magnitude of 10° to 20°.

One of the advantages achieved by the use of the annular seal of the invention is especially that it can be manufactured in an extraordinarily economical manner. In addition, the annular seal can be adapted to many different specific requirements, and there is no difficulty, for example, is making it resistant to corrosion.

It will be appreciated that the instant specification and examples are set forth by way of illustration and not limitation, and that various modifications and changes may be made without departing from the spirit and scope of the present invention.

What is claimed is:

1. An annular seal comprising an annular elastomeric lip member having at least one annular rim and an annular reinforcing member for said lip member, said reinforcing member having an end face provided with a groove in which said rim is held, at least the portion of the reinforcing member that is spaced from the groove being of flexible compressible construction and being of a diameter adjacent the groove which in uncompressed state is greater than the diameter when installed in operative position, the portion of the reinforcing member lying outside of the groove being provided with a plurality of slits dividing that portion into a plurality of segments uniformly distributed about the circumference.

2. An annular seal according to claim 1, wherein the lip member is joined to the reinforcing member by at least two rims axially spaced from and facing one another in a pincer-like manner.

3. An annular seal according to claim 1, wherein the lip member is joined to the reinforcing member by at least two rims disposed radially above one another.

4. An annular seal according to claim 1, wherein the rim has a projecting part of bulbous cross-section.

5. An annular seal according to claim 1, wherein the reinforcing member is formed of a thermoplastic, thermosetting plastic or elastomeric material.

6. An annular seal according to claim 1, wherein the reinforcing member in its outside diameter has an enlarged portion beveled at a shallow angle in both direction.

* * * * *